(12) United States Patent
Noguchi

(10) Patent No.: US 8,724,912 B2
(45) Date of Patent: May 13, 2014

(54) METHOD, APPARATUS, AND PROGRAM FOR COMPRESSING IMAGES, AND METHOD, APPARATUS, AND PROGRAM FOR DECOMPRESSING IMAGES

(75) Inventor: Yukinori Noguchi, Kanakawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 85 days.

(21) Appl. No.: 13/296,005

(22) Filed: Nov. 14, 2011

(65) Prior Publication Data

US 2013/0121588 A1    May 16, 2013

(51) Int. Cl.
*G06K 9/36* (2006.01)
*G06K 9/46* (2006.01)

(52) U.S. Cl.
USPC ............................ 382/232; 382/173; 382/282

(58) Field of Classification Search
USPC .......................... 382/232–233, 236, 173, 282
See application file for complete search history.

(56) References Cited

U.S. PATENT DOCUMENTS

| 2002/0051140 | A1* | 5/2002 | Yamada | 358/1.5 |
| 2009/0022403 | A1* | 1/2009 | Takamori et al. | 382/195 |
| 2009/0202169 | A1* | 8/2009 | Hayashi | 382/264 |
| 2010/0110298 | A1* | 5/2010 | Knee | 348/581 |
| 2010/0118935 | A1* | 5/2010 | Kakii et al. | 375/240.01 |
| 2010/0119156 | A1 | 5/2010 | Noguchi et al. | |
| 2010/0158398 | A1* | 6/2010 | Noguchi et al. | 382/232 |
| 2012/0275718 | A1* | 11/2012 | Takamori et al. | 382/238 |
| 2013/0071045 | A1* | 3/2013 | Hayashi | 382/299 |

FOREIGN PATENT DOCUMENTS

| JP | 2000-197051 A | 7/2000 |
| JP | 2009-49979 A | 3/2009 |

OTHER PUBLICATIONS

Japanese Office Action, dated Apr. 1, 2014, issued in Japanese Patent Application No. 2010-251396.

* cited by examiner

*Primary Examiner* — Li Liu
(74) *Attorney, Agent, or Firm* — Birch, Stewart, Kolasch & Birch, LLP

(57) ABSTRACT

Costs are reduced, by decreasing the number of encoders used to compress images when compressing two or more images at different compression rates. A region of interest is detected within a processing target image, and a region of interest image is generated. A reduced image is generated by reducing the size of the processing target image. The reduced image and the region of interest image are multiplexed in an image space to generate a multiplex image. The multiplex image is compressed to generate compressed image data.

18 Claims, 13 Drawing Sheets

METHOD, APPARATUS, AND PROGRAM FOR COMPRESSING IMAGES, AND METHOD, APPARATUS, AND PROGRAM FOR DECOMPRESSING IMAGES

BACKGROUND OF THE INVENTION

1. Field of the Invention

The present invention is related to an image compressing apparatus, an image compressing method, and an image compressing program. More specifically, the present invention is related to an image compressing apparatus, an image compressing method, and an image compressing program that extract regions of interest from images, and perform image compression such that the image quality of the regions of interest and other regions are different. In addition, the present invention is related to an image decompressing apparatus, an image decompressing method, and an image decompressing program that decompress compressed images.

2. Description of the Related Art

There are known techniques in which characteristic regions are extracted from within images, the images are divided into the characteristic regions and background regions other than the characteristic regions, and the characteristic regions and the background regions are compressed at different compression rates (refer to U.S. Patent Application Publication No. 20100119156, for example). The technique disclosed in U.S. Patent Application Publication No. 20100119156 extracts characteristic region images from a plurality of images that constitute a video, and generates a characteristic region video and a background region video. The characteristic region video is compressed by a compressing section for compressing the characteristic region to generate characteristic region video data, and the background region video is compressed by a compressing section for compressing the background region to generate background region video data. The characteristic region video data and the background region video data are correlated to each other by adding tag data or the like, then are output via a communications network.

The technique disclosed in U.S. Patent Application Publication No. 20100119156 employs separate compressing sections to compress the characteristic region video and the background region video. In this technique, it is necessary to provide the same number of compressing sections as the number of videos to be compressed, which results in the cost of circuits increasing corresponding to the number of compressing sections which are provided. In addition, the technique disclosed in U.S. Patent Application Publication No. 20100119156 generates the characteristic region video data and the background region video data as separate streams. Therefore, it is necessary to manage the two sets of video data such that they are correlated, in order to obtain the original video, which is troublesome.

SUMMARY OF THE INVENTION

The present invention has been developed in view of the foregoing circumstances. It is an object of the present invention to provide an image compressing apparatus an image compressing method, and an image compressing program that enables cost reductions, by decreasing the number of encoders used to compress images when compressing two or more images at different compression rates.

In order to achieve the above object, the present invention provides an image compressing apparatus, comprising:

an image reducing means that generates a reduced image by reducing the image size of an input processing target image;

a region of interest detecting means that detects a region of interest from the processing target image and generates a region of interest image by extracting the region of interest detected within the processing target image from the processing target image;

an image multiplexing means that generates a multiplex image by multiplexing the reduced image and the region of interest image within an image space; and a compressing means that generates compressed image data by compressing the multiplex image generated by the multiplexing means.

The present invention may adopt a configuration, wherein:

the image multiplexing means multiplexes the reduced image and the region of interest image at different regions of the multiplex image.

The image multiplexing means may perform multiplexing by arranging the reduced image at the upper portion of the multiplex image and arranging the region of interest image at the lower portion of the multiplex image.

The image compressing apparatus of the present invention may further comprise:

a partial image decompressing means that decompresses the portion of the multiplex image at which the reduced image is arranged, which has been compressed by the compressing means, based on the compressed image data;

an enlarging means that enlarges the portion of the multiplex image at which the reduced image is arranged, which has been decompressed by the partial image decompressing means to the image size of the processing target image; and a difference image generating means that generates a difference image between the portion of the multiplex image at which the reduced image is arranged, which has been enlarged by the enlarging means, and the region of interest image.

In this case, the compressing means initiates compression from the upper portion of the multiplex image, temporarily ceases compression when compression of the portion of the multiplex image at which the reduced image is arranged is complete;

the partial image decompressing means receives provisional compressed image data from the compressing means at the point in time at which the compressing means completes compression of the portion of the multiplex image at which the reduced image is arranged, and decompresses the portion of the multiplex image at which the reduced image is arranged based on the received provisional compressed image data;

the multiplexing means arranges the difference image at the lower portion of the multiplex image instead of the region of interest image and multiplexes the reduced image and the difference image within an image space; and the compressing means reinitiates compression of the multiplex image after the difference image is arranged at the lower portion of the multiplex image.

The image compressing apparatus of the present invention may further comprise:

a region of interest data attaching means that attaches region of interest data related to the position of the detected region of interest within the processing target image to the compressed image data.

The present invention also provides an image decompressing apparatus, comprising:

a decompressing means that decompresses compressed image data, which is a multiplex image obtained by multiplexing a reduced image obtained by reducing a processing target image and a region of interest image obtained by extracting a region of interest portion from the processing target image in an image space and then compressed, to generate the multiplex image;

an image separating means that separates the reduced image and the region of interest image within the multiplex image generated by the decompressing means;

an image enlarging means that enlarges the separated reduced image to the size of the processing target image; and an image combining means that generates a combined image by combining the reduced image, which has been enlarged by the enlarging means, and the region of interest image.

The image decompressing apparatus of the present invention may adopt a configuration wherein:

region of interest data related to the position of the region of interest within the processing target image is attached to the compressed image data;

the image decompressing apparatus further comprises a region of interest data separating means for separating the region of interest data from the compressed image data; and the image combining means generates the combined image by employing the region of interest data to overlap the region of interest image on the reduced image, which has been enlarged.

The image decompressing apparatus of the present invention may adopt a configuration wherein:

a difference image that represents the difference between the compressed reduced image which is enlarged to the size of the processing target image and the region of interest image is multiplexed with the reduced image instead of the region of interest image;

the image separating means separates the reduced image and the difference image within the multiplex image instead of the reduced image and the region of interest image; and the image combining means combines the reduced image, which has been enlarged, and the difference image instead of the reduced image, which has been enlarged, and the region of interest image.

In this case, the image combining means may generate the combined image by adding the difference image to the reduced image, which has been enlarged.

The present invention further provides an image compressing/decompressing apparatus, comprising:

an image reducing means that generates a reduced image by reducing the image size of an input processing target image;

a region of interest detecting means that detects a region of interest from the processing target image and generates a region of interest image by extracting the region of interest detected within the processing target image from the processing target image;

an image combining means that generates a multiplex image by multiplexing the reduced image and the region of interest image within an image space;

a compressing means that generates compressed image data by compressing the multiplex image generated by the image combining means;

a decompressing means that decompresses the compressed image data, to generate the multiplex image;

an image separating means that separates the reduced image and the region of interest image within the multiplex image generated by the decompressing means;

an image enlarging means that enlarges the separated reduced image to the size of the processing target image; and an image combining means that generates a combined image by combining the reduced image, which has been enlarged by the enlarging means, and the region of interest image.

The present invention provides a first image compressing method, characterized by comprising the steps of:

generating a reduced image by reducing the image size of an input processing target image;

detecting a region of interest from the processing target image and generating a region of interest image by extracting the region of interest detected within the processing target image from the processing target image;

generating a multiplex image by multiplexing the reduced image and the region of interest image within an image space; and generating compressed image data by compressing the generated multiplex image.

The present invention provides a second image compressing method, characterized by comprising the steps of:

generating a reduced image by reducing the image size of an input processing target image;

detecting a region of interest from the processing target image and generating a region of interest image by extracting the region of interest detected within the processing target image from the processing target image;

arranging the reduced image at the upper portion of a multiplex image and arranging the region of interest image at the lower portion of the multiplex image within an image space for multiplexing the reduced image and the region of interest image;

sequentially compressing the multiplex image from the upper portion thereof;

temporarily ceasing compression when compression of the portion of the multiplex image at which the reduced image is arranged is complete;

decompressing the portion of the multiplex image at which the reduced image is arranged based on provisional compressed image data at the point in time at which compression of the portion of the multiplex image at which the reduced image is arranged is complete;

enlarging the decompressed portion of the multiplex image at which the reduced image is arranged to the image size of the processing target image;

generating a difference image between the portion of the multiplex image at which the reduced image is arranged, which has been enlarged, and the region of interest image; and arranging the difference image at the lower portion of the multiplex image, then reinitiating compression of the multiplex image, to generate compressed image data of the multiplex image.

The present invention provides a first image decompressing method, characterized by comprising the steps of:

decompressing compressed image data, which is a multiplex image obtained by multiplexing a reduced image obtained by reducing a processing target image and a region of interest image obtained by extracting a region of interest portion from the processing target image in an image space and then compressed, to generate the multiplex image;

separating the reduced image and the region of interest image within the generated multiplex image;

enlarging the separated reduced image to the size of the processing target image; and generating a combined image by combining the reduced image, which has been enlarged, and the region of interest image.

The present invention provides a second image decompressing method, characterized by comprising the steps of:

decompressing compressed image data, which is a multiplex image obtained by multiplexing a reduced image obtained by reducing a processing target image and a difference image that represents the difference between the compressed reduced image which is enlarged to the size of the processing target image and a region of interest image obtained by extracting a region of interest portion from the processing target image in an image space and then compressed, to generate the multiplex image;

separating the reduced image and the difference image within the generated multiplex image;

enlarging the separated reduced image to the size of the processing target image; and generating a combined image by combining the reduced image, which has been enlarged, and the difference image.

Further, the present invention provides a first image compressing program that causes a computer to execute the procedures of:

generating a reduced image by reducing the image size of an input processing target image;

detecting a region of interest from the processing target image and generating a region of interest image by extracting the region of interest detected within the processing target image from the processing target image;

generating a multiplex image by multiplexing the reduced image and the region of interest image within an image space; and generating compressed image data by compressing the generated multiplex image.

The present invention provides a second image compressing program that causes a computer to execute the procedures of:

generating a reduced image by reducing the image size of an input processing target image;

detecting a region of interest from the processing target image and generating a region of interest image by extracting the region of interest detected within the processing target image from the processing target image;

arranging the reduced image at the upper portion of a multiplex image and arranging the region of interest image at the lower portion of the multiplex image within an image space for multiplexing the reduced image and the region of interest image;

sequentially compressing the multiplex image from the upper portion thereof;

temporarily ceasing compression when compression of the portion of the multiplex image at which the reduced image is arranged is complete;

decompressing the portion of the multiplex image at which the reduced image is arranged based on provisional compressed image data at the point in time at which compression of the portion of the multiplex image at which the reduced image is arranged is complete;

enlarging the decompressed portion of the multiplex image at which the reduced image is arranged to the image size of the processing target image;

generating a difference image between the portion of the multiplex image at which the reduced image is arranged, which has been enlarged, and the region of interest image; and arranging the difference image at the lower portion of the multiplex image, then reinitiating compression of the multiplex image, to generate compressed image data of the multiplex image.

The present invention provides a first image decompressing program that causes a computer to execute the procedures of:

decompressing compressed image data, which is a multiplex image obtained by multiplexing a reduced image obtained by reducing a processing target image and a region of interest image obtained by extracting a region of interest portion from the processing target image in an image space and then compressed, to generate the multiplex image;

separating the reduced image and the region of interest image within the generated multiplex image;

enlarging the separated reduced image to the size of the processing target image; and generating a combined image by combining the reduced image, which has been enlarged, and the region of interest image.

The present invention provides a second image decompressing program that causes a computer to execute the procedures of:

decompressing compressed image data, which is a multiplex image obtained by multiplexing a reduced image obtained by reducing a processing target image and a difference image that represents the difference between the compressed reduced image which is enlarged to the size of the processing target image and a region of interest image obtained by extracting a region of interest portion from the processing target image in an image space and then compressed, to generate the multiplex image;

separating the reduced image and the difference image within the generated multiplex image;

enlarging the separated reduced image to the size of the processing target image; and generating a combined image by combining the reduced image, which has been enlarged, and the difference image.

The image compressing apparatus, the image compressing method, and the image compressing program of the present invention generate a multiplexed image, in which a reduced image having a reduced image size and a region of interest image are multiplexed, and compresses the multiplex image. In the present invention, the reduced image and the region of interest image, which are to be compressed using different compression rates, are multiplexed into the multiplex image and then compressed. Therefore, a single compressing means can be employed to compress both images, and cost reductions become possible by decreasing the number of encoders to be employed to perform compression. In addition, the image decompressing apparatus, the image decompressing method, and the image decompressing program of the present invention can decompress compressed image data which has been compressed by the image compressing apparatus of the present invention, to restore compressed images.

DESCRIPTION OF THE PREFERRED EMBODIMENTS

Figure 1:
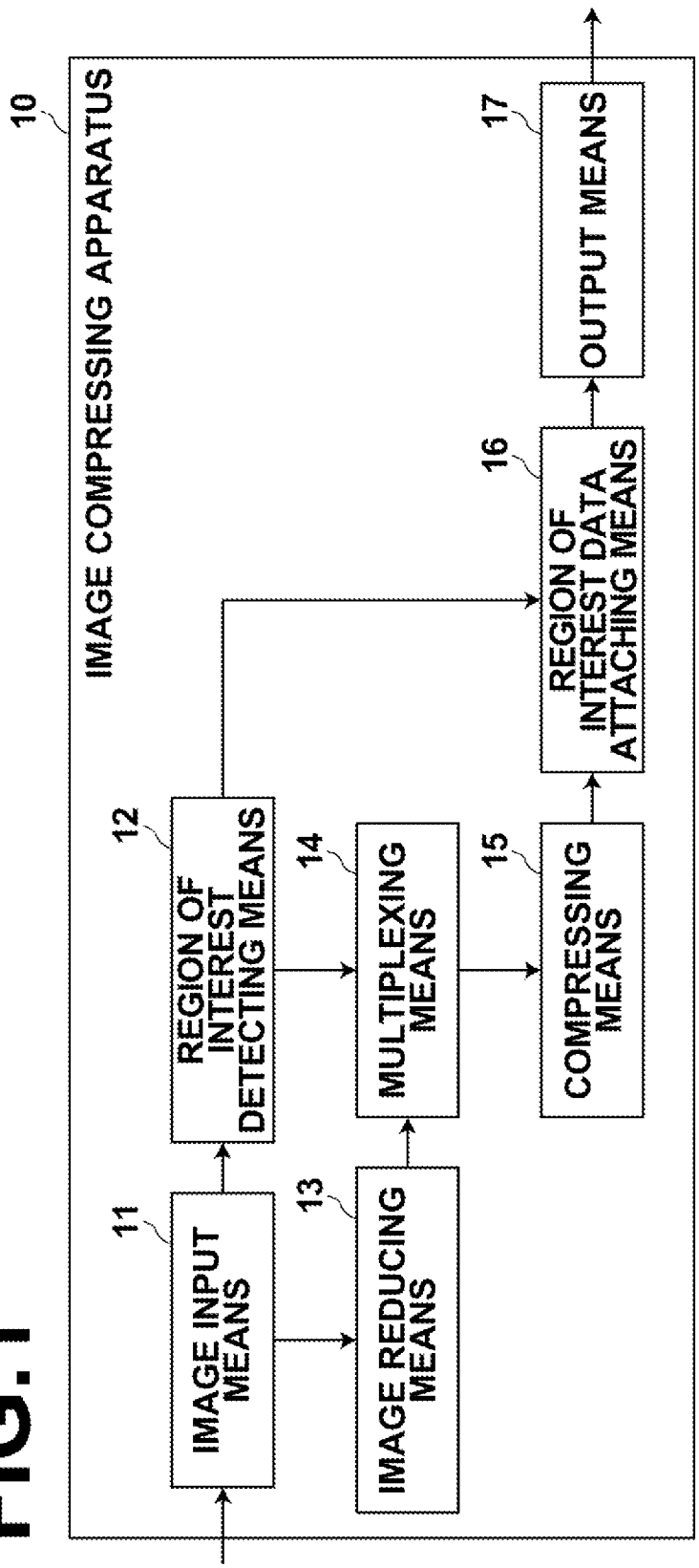
FIG. 1 is a block diagram that illustrates an image compressing apparatus according to a first embodiment of the present invention.

Hereinafter, embodiments of the present invention will be described in detail with reference to the attached drawings. FIG. 1 illustrates an image compressing apparatus 10 according to a first embodiment of the present invention. The image compressing apparatus 10 is equipped with: an image input means 11; a region of interest detecting means 12; an image reducing means 13; a multiplexing means 14; a compressing means (encoder) 15; a region of interest data attaching means 16; and an output means 17. The functions of each component of the image compressing apparatus 10 can be realized by a computer executing processes according to a predetermined program.

The image input means 11 inputs processing target images. The image input means 11 inputs images which are photographed employing a photography apparatus (not shown) as processing target images, for example. Alternatively, the image input means 11 may read out processing target images from a storage device (not shown) that stores images therein. The image input 11 means may sequentially input a plurality of frame images that constitute videos.

The region of interest detecting means 12 detects ROI's (regions of interest) from the processing target images, to generate region of interest images. Any desired algorithm may be employed to detect the regions of interest. The region of interest detecting means 12 may detect regions within the processing target images in which predetermined detection target objects appear. Alternatively, the region of interest detecting means 12 may detect portions at which movement occurs among frame images as the regions of interest. The resolution (image size) of the region of interest images may be the same as the resolution of the processing target images.

The image reducing means 13 generates reduced images, by reducing the image size of the processing target images. In other words, the image reducing means 13 generates images having a predetermined resolution by decreasing the resolution of the processing target images. The image reducing means 13 may thin pixels from the processing target images at predetermined rates to generate the reduced images. The technique employed for image reduction is not particularly limited. The image reducing means 13 decreases the resolution of the reduced images such that they are lower than the resolution of the region of interest images.

The multiplexing means 14 generates multiplex images, by multiplexing the reduced images reduced by the image reducing means 13 and the region of interest images generated by the region of interest detecting means 12 within an image space. The multiplexing means 14 arranges the reduced images and the region of interest images within different regions of the multiplex image. For example, a multiplex image may be prepared having a number of pixels in the horizontal direction equal to the number of pixels in the horizontal direction of a region of interest image, and a number of pixels in the vertical direction equal to a sum of the number of pixels in the vertical direction of the region of interest image and the number of pixels in the vertical direction of a reduced image. The reduced image may be arranged in the upper portion of the multiplex image, the region of interest may be arranged at the lower portion of the multiplex image, and then the image is multiplexed.

The compressing means 15 compresses the multiplex images which are generated by the multiplexing means 14 to generate compressed image data. The image compression format is not particularly limited. The compressing means 15 may perform image compression using the H.264 standard, for example. The region of interest data attaching means 16 attaches region of interest data related to the positions of the region of interest images within the processing target images to the compressed image data generated by the compressing means 15. The output means 17 outputs the compressed image data, to which the region of interest data is attached. The output means outputs the compressed image data to a receiving apparatus via a communications network, for example. Alternatively, the output means 17 may output the compressed image data to a storage device, such as a hard disk drive.

Figure 2:
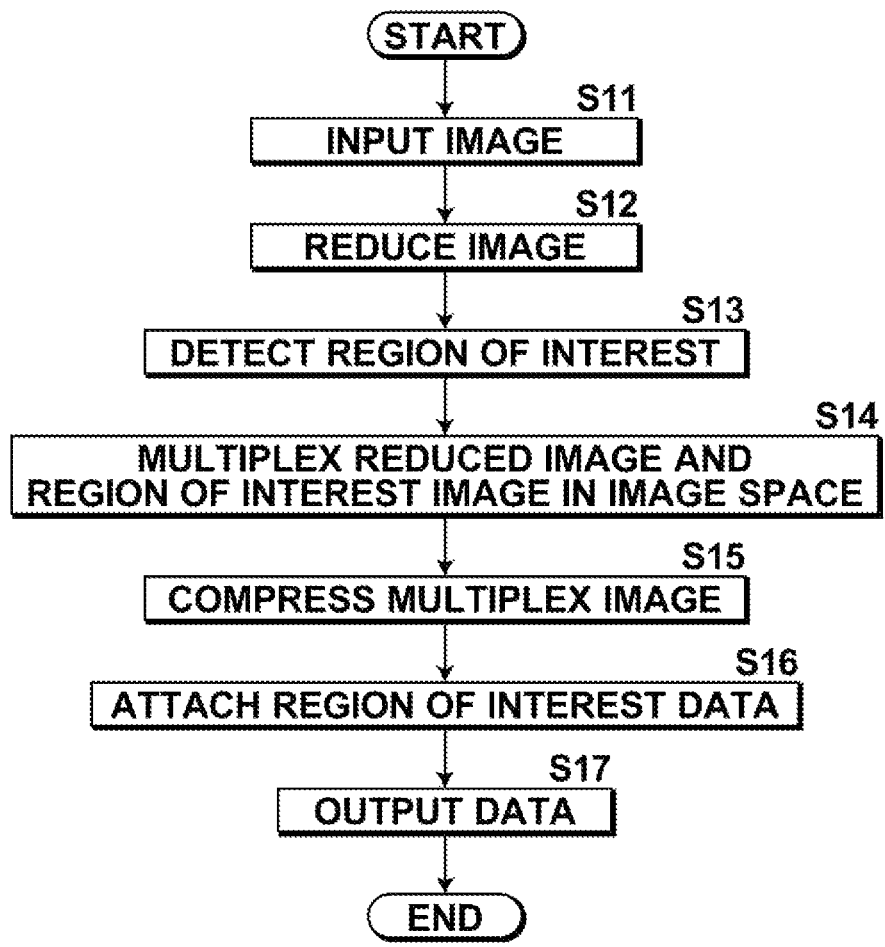
FIG. 2 is a flow chart that illustrates the operational procedures performed by the image compressing apparatus of the first embodiment.

FIG. 2 illustrates the operational procedures performed by the image compressing apparatus of the first embodiment. The image input means 11 inputs a processing target image (step S11). The image reducing means 13 generates a reduced image, by decreasing the resolution of the processing target image (step S12). The image reducing means 13 decreases the image size of the processing target image to ½ the original size in both the vertical and horizontal direction, to generate a reduced image of which the resolution has been decreased to half the original resolution, for example. The image reducing means 13 outputs the generated reduced image to the multiplexing means 14.

The region of interest detecting means 12 detects a region of interest from the processing target image (step S13). The region of interest detecting means 12 extracts the region of interest from the processing target image, and generates an image in which the pixel values of portions other than the extracted region of interest are fixed at a predetermined value, for example, 0 (black), as a region of interest image. The region of interest detecting means 12 outputs the generated region of interest image to the multiplexing means 14. In addition, the region of interest detecting means 12 outputs region of interest data that indicates the position of the detected region of interest within the processing target image to the region of interest data attaching means 16.

The multiplexing means 14 multiplexes the reduced image and the region of interest image within an image space (step S14). That is, the multiplexing means 14 multiplexes the reduced image and the region of interest image into a single multiplex image. The compressing means 15 compresses the multiplex image to generate compressed image data (step S15). The region of interest data attaching means 16 attaches the region of interest data to the compressed image data generated by the compressing means 15 (step S16). The output means 17 outputs the compressed image data, to which the region of interest data is attached, to an image decompressing apparatus, a storage device, or the like (step S17).

Figure 3:
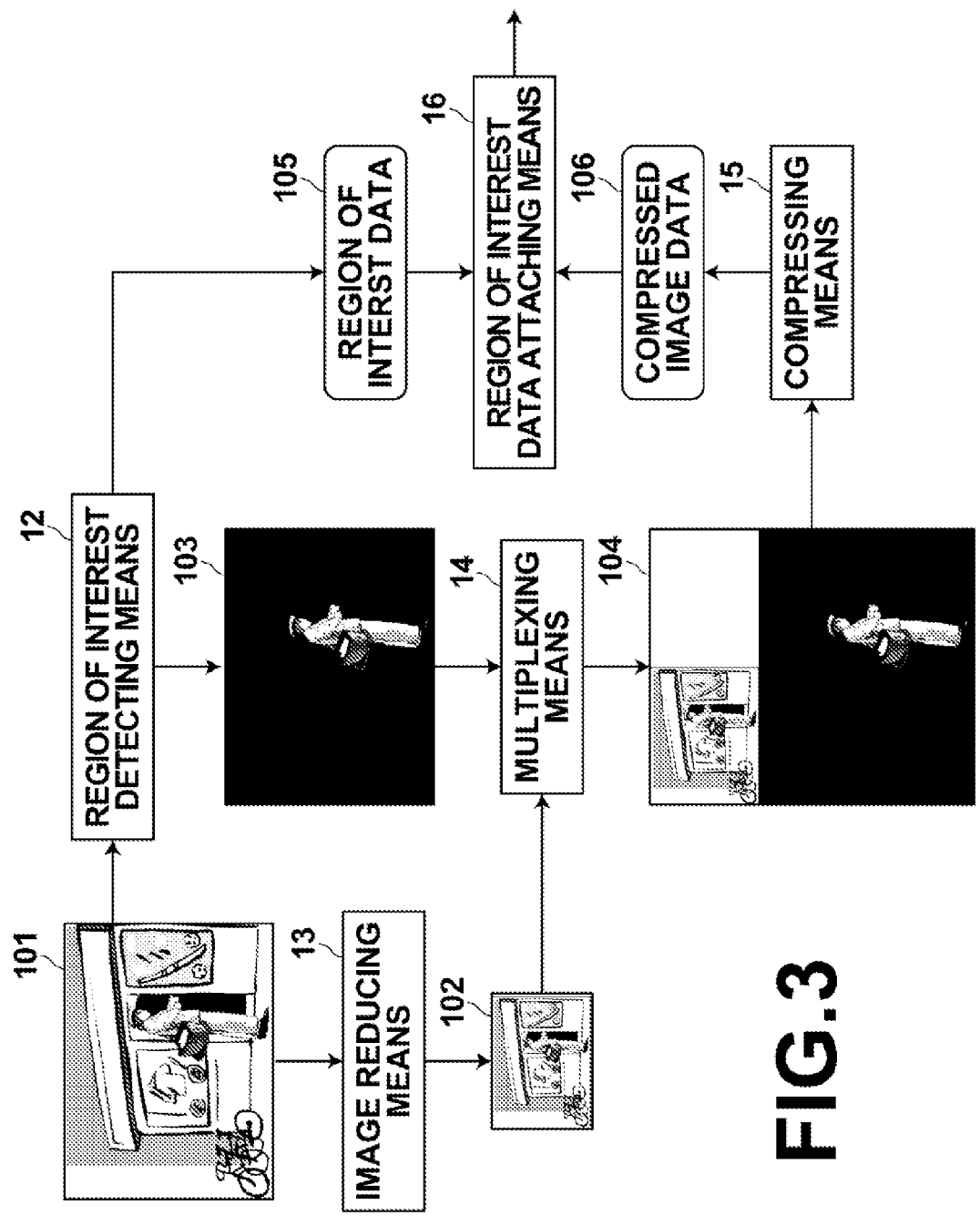
FIG. 3 is a block diagram that illustrates specific examples of images which are generated by each section of the image compressing apparatus of the first embodiment.

FIG. 3 illustrates specific examples of images which are generated by each section of the image compressing apparatus 10 of the first embodiment. An input processing target image 101 is provided to the region of interest detecting means 12 and the image reducing means 13. The image reducing means 13 decreases the resolution of the processing target image 101 to generate a reduced image 102. The processing target image 101 and the reduced image 102 are images that represent the same contents. However, the image size of the reduced image 102 is smaller than that of the processing target image 101.

The region of interest detecting means 12 detects a region that constitutes a person as a region of interest within the processing target image 101, and generates the region of interest image 103. The region of interest detecting means 12 generates an image having the same pixel values as the processing target image 101 at the portion that constitutes the detected person and pixel values fixed at 0 at portions other than the detected person as a region of interest image 103. The region of interest detecting means 12 also generates region of interest data 105 that indicates the position of the region of interest within the processing target image.

The multiplexing means 14 generates a multiplex image 104 by multiplexing the reduced image 102 and the region of interest image 103 into a single image. The reduced image 102 is arranged at the upper portion of the multiplex image 104 and the region of interest image 103 is arranged at the lower portion of the multiplex image 104. Because the reduced image 102 is smaller than the region of interest image 103, a blank portion will be formed at which the reduced image 102 is not present, at the upper portion of the multiplex image 104. The blank portion of the multiplex image 104 may be filled by the color white.

The compressing means 15 compresses the multiplex image 104 to generate compressed image data 106. For example, in the case that processing target images 101 that constitute a video are sequentially input, the multiplexing means 14 sequentially generates multiplex images corresponding to processing target images 101 for each frame. The compressing means 15 may perform image compression utilizing multiplex images for the preceding and following frames. The region of interest data attaching means 16 attaches region of interest data 105 to compressed image data 106. The compressed image data 106 having the region of interest data 105 attached thereto is output via the output means 17.

Figure 4:
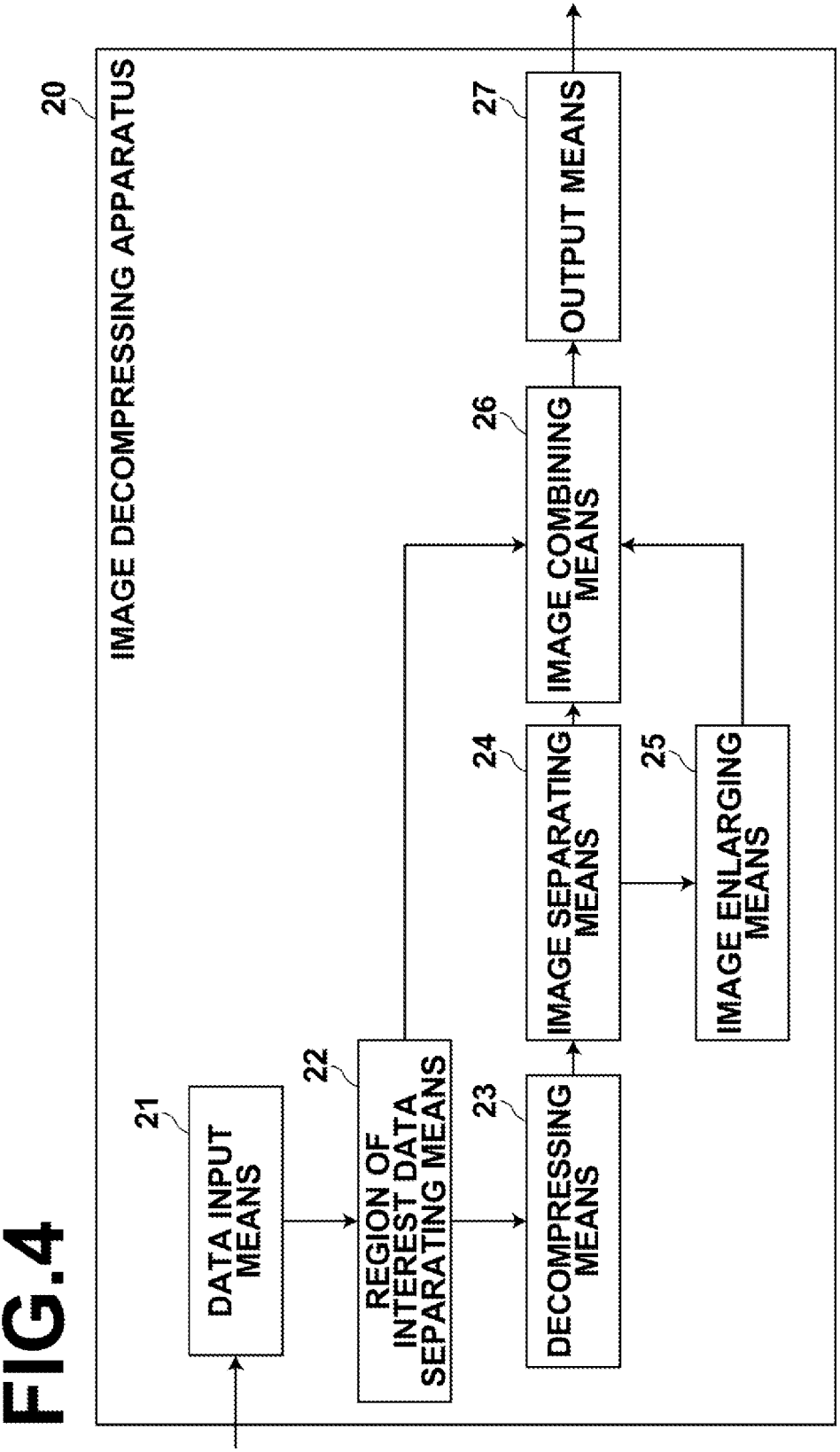
FIG. 4 is a block diagram that illustrates an image decompressing apparatus that corresponds to the image compressing apparatus of the first embodiment.

Next, an image decompressing apparatus that decompresses images which are compressed by the image compressing apparatus 10 will be described. FIG. 4 illustrates an image decompressing apparatus 20 that corresponds to the image compressing apparatus 10. The image decompressing apparatus 20 is equipped with: a data input means 21; a region of interest data separating means 22; a decompressing means (decoder) 23; an image separating means 24; an image enlarging means 25; an image combining means 26; and an output means 27. The functions of each component of the image decompressing apparatus 20 can be realized by a computer executing processes according to a predetermined program.

The data input means 21 inputs the compressed image data output by the output means 17 of the image compressing apparatus 10 of FIG. 1. That is, the data input means 21 inputs compressed image data obtained by compressing multiplex images, which are obtained by multiplexing reduced images of processing target images and region of interest images extracted from the processing target images within image spaces. Region of interest data are attached to these compressed image data.

The region of interest data separating means 22 separates the region of interest data from the compressed image data. The region of interest data separating means 22 outputs the compressed image data to the decompressing means 23 and outputs the region of interest data to the image combining means 26. The decompressing means 23 decompresses the compressed image data to generate the multiplex image. The decompressing means 23 decompresses the compressed image data using a decompression method corresponding to the compression method employed by the compressing means 15 of the image compressing apparatus 10.

The image separating means 24 separates the reduced image and the region of interest image from the multiplex image generated by the decompressing means 23. The image separating means 24 outputs the separated reduced image to the image enlarging means 25, and outputs the region of interest image to the image combining means 26. The image enlarging means 25 enlarges the separated reduced image to the size of the processing target image. The image size of the region of interest image is the same as that of the processing target image, and therefore the image size of the enlarged reduced image becomes the same as that of the region of interest image. The enlarging process performed by the image enlarging means 25 is the inverse of the process performed by the image reducing means 13 of the image compressing apparatus 10.

The image combining means 26 generates a combined image in which the region of interest image and the reduced image, which has been enlarged by the image enlarging means 25, are combined. At this time, the image combining means 26 employs the region of interest data separated by the region of interest data separating means 22 to overlap the region of interest image on the reduced image which has been enlarged. The output means 27 outputs the combined image generated by the image combining means 26 to a display device for performing image display or the like.

Figure 5:
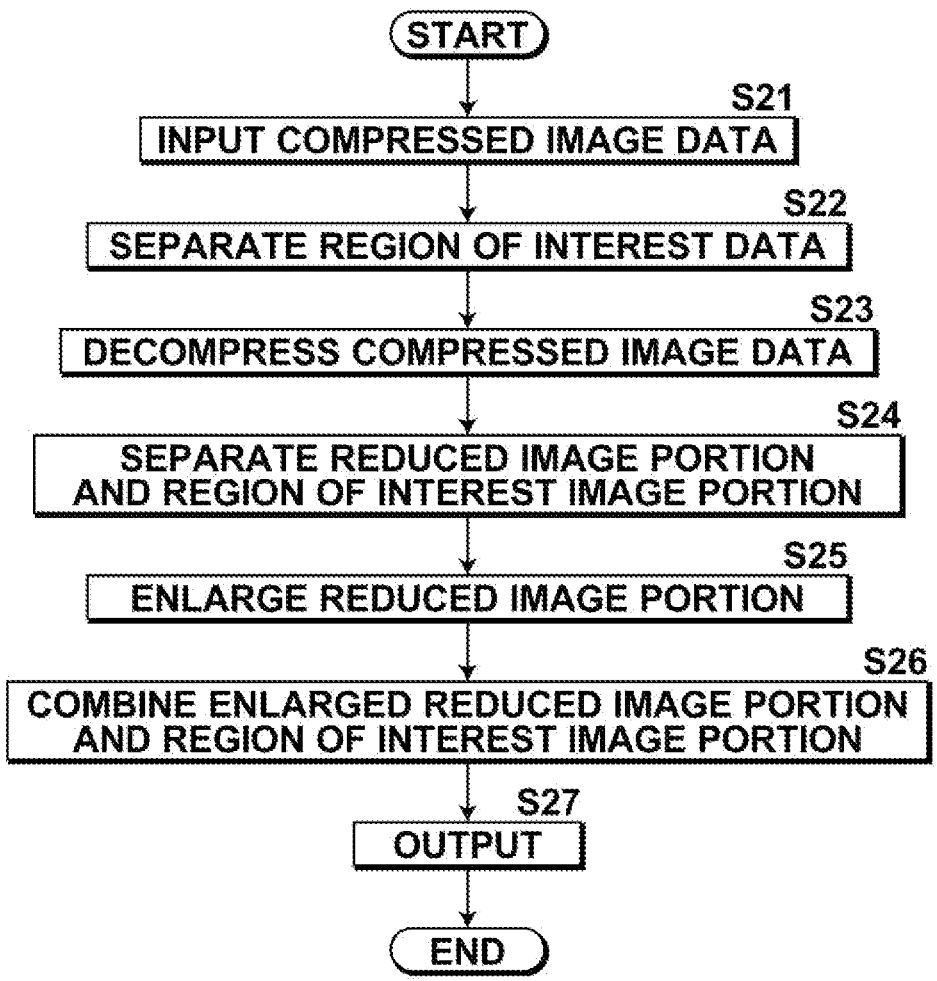
FIG. 5 is a flow chart that illustrates the operational procedures performed by the image decompressing apparatus of FIG. 4.

FIG. 5 illustrates the operational procedures involved in image decompression. The data input means 21 inputs compressed image data, to which region of interest data is attached (step S21). The data input means 21 inputs the compressed input data output by the image compressing apparatus 10 (refer to FIG. 1) to the image decompressing apparatus 20 via a communications network. Alternatively, the data input means 21 may read out the compressed image data from a storage device.

The region of interest data separating means 22 separates the compressed image data and the region of interest data which is attached to the compressed image data (step S22). The decompressing means 23 decompresses the compressed image data, to restore the multiplex image which was compressed by the image compressing apparatus 10 (step S23). The image separating means 24 separates the restored multiplex image into the reduced image and the region of interest image (step S24). The image enlarging means 25 enlarges the reduced image to the image size of the processing target image (step S25). The SR (Super Resolution) technique may be employed to enlarge the image. Deterioration in image quality of the enlarged image can be prevented by employing the Super Resolution technique.

The image combining means 26 combines the reduced image, which has been enlarged, and the region of interest image (step S26). At this time, the image combining means 26 combines the images by employing the region of interest data as mask data. More specifically, the image combining means cuts out only the region of interest from the region of interest image, and overlaps the cut out region of interest onto the reduced image which has been enlarged. The output means 27 outputs the combined image which is combined by the image combining means 26 to a display apparatus or the like (step S27).

Figure 6:
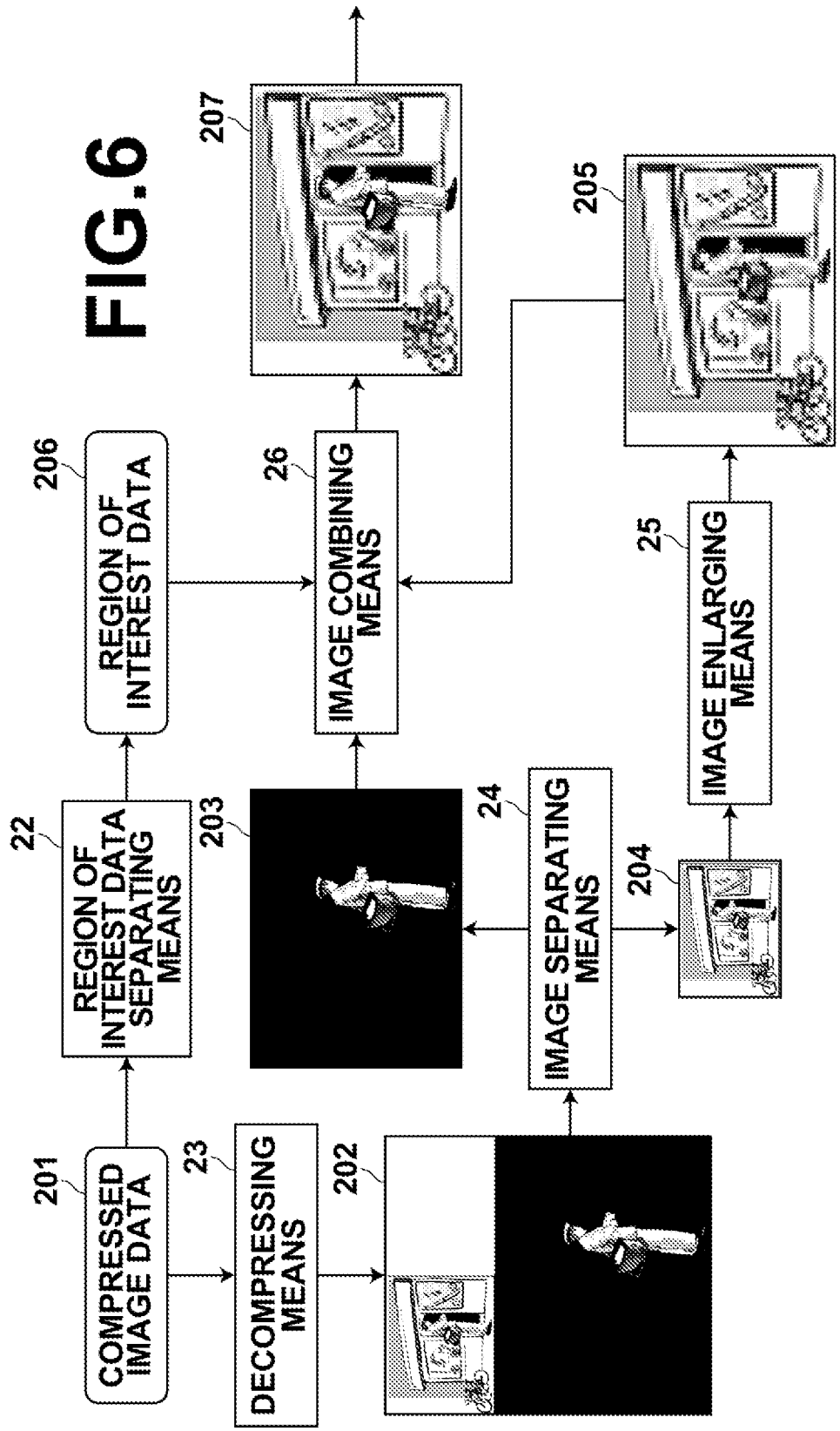
FIG. 6 is a block diagram that illustrates specific examples of images which are generated by each section of the image decompressing apparatus of FIG. 4.

FIG. 6 illustrates specific examples of images which are generated by each section of the image decompressing apparatus 20. Compressed image data 201 is a set of compressed image data obtained by compressing the processing target image 101 illustrated in FIG. 3 with the image compressing apparatus 10, for example. The region of interest data separating means 22 separates region of interest data 206 attached to the compressed image data 201 from the compressed image data 201. The decompressing means 23 restores a multiplex image 202 from the compressed image data 201. The contents of the multiplex image 202 are the same as those of the multiplex image 104 of FIG. 3. However, the images are not completely the same, and there are portions at which image quality is lower due to compression having been performed.

The image separating means 24 separates a reduced image 204 and a region of interest image 203 from the multiplex image 202. The image enlarging means 25 enlarges the reduced image 204, and generates a reduced image 205 which has been enlarged. By enlarging the reduced image 204, the image size of the reduced image 205 which has been enlarged becomes the same as the image size of the region of interest image 203.

The image combining means 26 employs the region of interest data 206 to combine the reduced image 205 which has been enlarged and the region of interest image 203, to generate a combined image 207. The image combining means 26 cuts out the portion at which the person appears within the region of interest image 203, and overlaps the cut out portion on the reduced image 205, which has been enlarged, to generate the combined image 207. In the combined image 207, pixels of the reduced image 205 which has been enlarged are arranged as pixels of regions other than the portion at which the person appears, and pixels of the region of interest 203 are arranged as pixels of the region in which the person appears. The image decompressing apparatus 20 outputs the combined image 207.

If the processing target image 101 (refer to FIG. 3) which is input to the image compressing apparatus 10 is compared against the combined image 207 output by the image decompressing apparatus 20, the regions other than the portion at which the person appears are obtained by enlarging the image which was once reduced, and therefore the image quality of the combined image 207 at regions other than the portion at which the person appears is lower than that of the processing target image 101. Meanwhile, with respect to the region of interest, there is less deterioration of image quality because image reduction is not performed at this portion.

In the first embodiment, the multiplexing means 14 multiplexes the region of interest image, which is the region of interest extracted from the processing target image, and the reduced image, which is the reduced processing target image, within an image space to generate a single multiplex image. The compressing means 15 compresses the multiplex image, and the output means 17 outputs the compressed image data obtained by image compression. The image compressing apparatus 10 of the first embodiment multiplexes the region of interest image and the reduced image into the single multiplex image, then compresses the multiplex image. Therefore, it is not necessary to employ separate compressing means for each of the region of interest image and the reduced image. The image compressing apparatus 10 needs only to be equipped with the single compressing means 15 for compressing the multiplex image. Therefore, the number of necessary compressing means can be decreased to reduce the cost of circuits.

U.S. Patent Application Publication No. 20100119156 describes that a single compressor can realize the compressing section for compressing the characteristic region video and the compressing section for compressing the background region video. In this case, the characteristic region video and the background region video are compressed in temporal sequence. However, assuming that a characteristic region video of a certain length is compressed, then a background region video of the same length is compressed thereafter, the timings at which compressed characteristic region video data and compressed background region video data are generated will be shifted greatly. As a result, real time properties will be lost. The image compressing apparatus 10 of the first embodiment compresses the region of interest image and the reduced image as a single multiplex image. Therefore, image compression is possible without losing real time properties.

In addition, a configuration may be considered, in which frame images that constitute the characteristic region video and frame images that constitute the background region video are alternately input into the compressor. However, because the frame images that constitute two videos are alternately input, it is necessary for the compressor to refer to every other frame image in the case that image compression of the characteristic region video is performed by referring to preceding and following frame images. Therefore, a problem that the reference relationships among frames becomes complex will arise. Further, a problem that more memory will become necessary will also arise. The image compressing apparatus 10 of the first embodiment multiplexes the region of interest image and the reduced image into a single multiplex image. Therefore, image compression becomes possible without the reference relationship becoming complex. In addition, the compressing means needs only to compress a single multiplex image, and it is not necessary to refer to other frames. Accordingly, it is possible to employ existing compressing means as the compressing means 15.

The image decompressing apparatus 20 corresponding to the image compressing apparatus 10 of the first embodiment can obtain the region of interest image and the reduced image from the single multiplex image by decompressing the compressed image data, because the region of interest image and the reduced image are multiplexed into the single multiplex image. In the technique disclosed in U.S. Patent Application Publication No. 20100119156, two separate decompressing means for decompressing each of the characteristic region video data and the background region video data are necessary. However, in the image decompressing apparatus 20, only a single decompressing means 23 is necessary. In addition, the technique disclosed in U.S. Patent Application Publication No. 20100119156 generates characteristic region video data and background region video data as separate streams. Therefore it is necessary to provide a multiplexer for integrating the plurality of streams at the image compressing side, and a demultiplexer for separating the plurality of streams at the image decompressing side. According to the first embodiment, the region of interest image and the reduced image can be obtained from a single multiplex image, and therefore, it is not necessary to provide such a multiplexer or such a demultiplexer. In addition, the region of interest image and the reduced image are obtained in a synchronized manner from the single multiplex image. Therefore, an advantageous effect that it is not necessary to manage the region of interest image and the reduced image in a correlated manner is also obtained.

Figure 7:
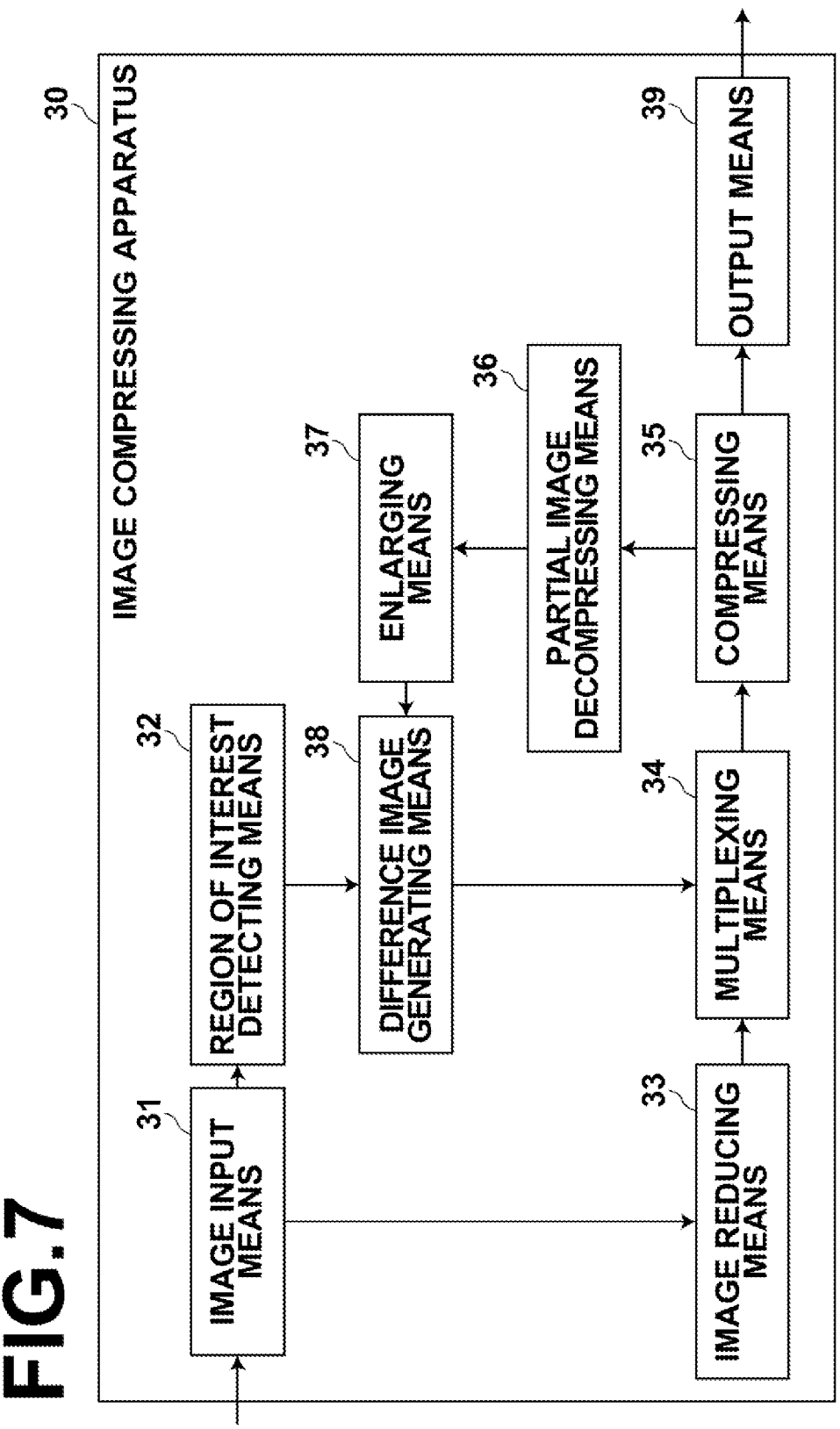
FIG. 7 is a block diagram that illustrates an image compressing apparatus according to a second embodiment of the present invention.

Next, a second embodiment of the present invention will be described. FIG. 7 illustrates an image compressing apparatus 30 according to a second embodiment of the present invention. The image compressing apparatus 30 is equipped with: an image input means 31; a region of interest detecting means 32; an image reducing means 33; a multiplexing means 34; a compressing means 35; a partial image decompressing means 36; an enlarging means 37; a difference image generating means 38 and an output means 39. The functions of each component of the image compressing apparatus 30 can be realized by a computer executing processes according to a predetermined program.

The image input means 31 inputs processing target images. The image input means 31 inputs images which are photographed employing a photography apparatus (not shown) as processing target images, for example. Alternatively, the image input means 31 may read out processing target images from a storage device (not shown) that stores images therein. The image input 31 means may sequentially input a plurality of frame images that constitute videos.

The region of interest detecting means 32 detects regions of interest from the processing target images, to generate region of interest images. Any desired algorithm may be employed to detect the regions of interest. The region of interest detecting means 32 may detect regions within the processing target images in which predetermined detection target objects appear. Alternatively, the region of interest detecting means 32 may detect portions at which movement occurs among frame images as the regions of interest. The resolution (image size) of the region of interest images may be the same as the resolution of the processing target images.

The image reducing means 33 generates reduced images, by reducing the image size of the processing target images. In other words, the image reducing means 33 generates images having a predetermined resolution by decreasing the resolution of the processing target images. The image reducing means 33 may thin pixels from the processing target images at predetermined rates to generate the reduced images. The technique employed for image reduction is not particularly limited. The image reducing means 33 decreases the resolution of the reduced images such that they are lower than the resolution of the region of interest images.

The multiplexing means 34 generates multiplex images, by multiplexing the reduced images reduced by the image reducing means 33 and the region of interest images generated by the region of interest detecting means 32 within an image space. As will be described later, in the second embodiment, not the region of interest image itself, but a region of interest image in the form of a difference image generated by the difference image generating means 38 is multiplexed into the multiplex image. The multiplexing means 34 may employ a multiplex image having a number of pixels in the horizontal direction equal to the number of pixels in the horizontal direction of a region of interest image, and a number of pixels in the vertical direction equal to a sum of the number of pixels in the vertical direction of the region of interest image and the number of pixels in the vertical direction of a reduced image. The multiplexing means 34 first arranges the reduced image in the upper portion of the multiplex image.

The compressing means 35 compresses the multiplex images which are generated by the multiplexing means 34 to generate compressed image data. The image compression format is not particularly limited. The compressing means 35 may perform image compression using the H.264 standard, for example. The compressing means 35 initiates compression from the upper portion of the multiplex image, and temporarily ceases compression when compression of the reduced image portion is completed. The partial image decompressing means 36 decompresses the reduced image portion of the compressed multiplex image, based on the compressed image data generated by the compressing means 35. The partial image decompressing means 36 receives provisional compressed image data from the compressing means 35 at the point in time at which compression of the reduced image portion of the multiplex image is complete, and decompresses the reduced image portion, based on the received provisional compressed image data.

The enlarging means 37 enlarges the reduced image portion which has been decompressed by the partial image decompressing means 36 to the image size of the processing target image. That is, the enlarging process performed by the enlarging means 37 is the inverse of the process performed by the image reducing means 33. The difference image generating means 38 generates a difference image between the reduced image portion which has been enlarged by the enlarging means 37 and the region of interest image generated by the region of interest detecting means 32. At this time, the difference image generating means 38 receives region of interest data from the region of interest detecting means 32, and generates a difference image regarding the position of the processing target image that corresponds to the region of interest. The pixel values of portions of the difference image other than the region of interest may be fixed at a predetermined pixel value, for example, 0 (black).

After the difference image is generated, the multiplexing means 34 arranges the difference image at the lower portion of the multiplex image, then multiplexes the reduced image and the difference image into a single multiplex image. After the difference image is arranged within the multiplex image, the compressing means 35 reinitiates compression of the multiplex image. The compressing means 35 ultimately generates compressed image data, obtained by compressing the multiplex image in which the reduced image and the difference image are multiplexed within an image space. The output means 39 outputs the compressed image data to a receiving apparatus via a communications network. Alternatively, the output means 39 may output the compressed image data to a storage device such as a hard disk drive.

Figure 8:
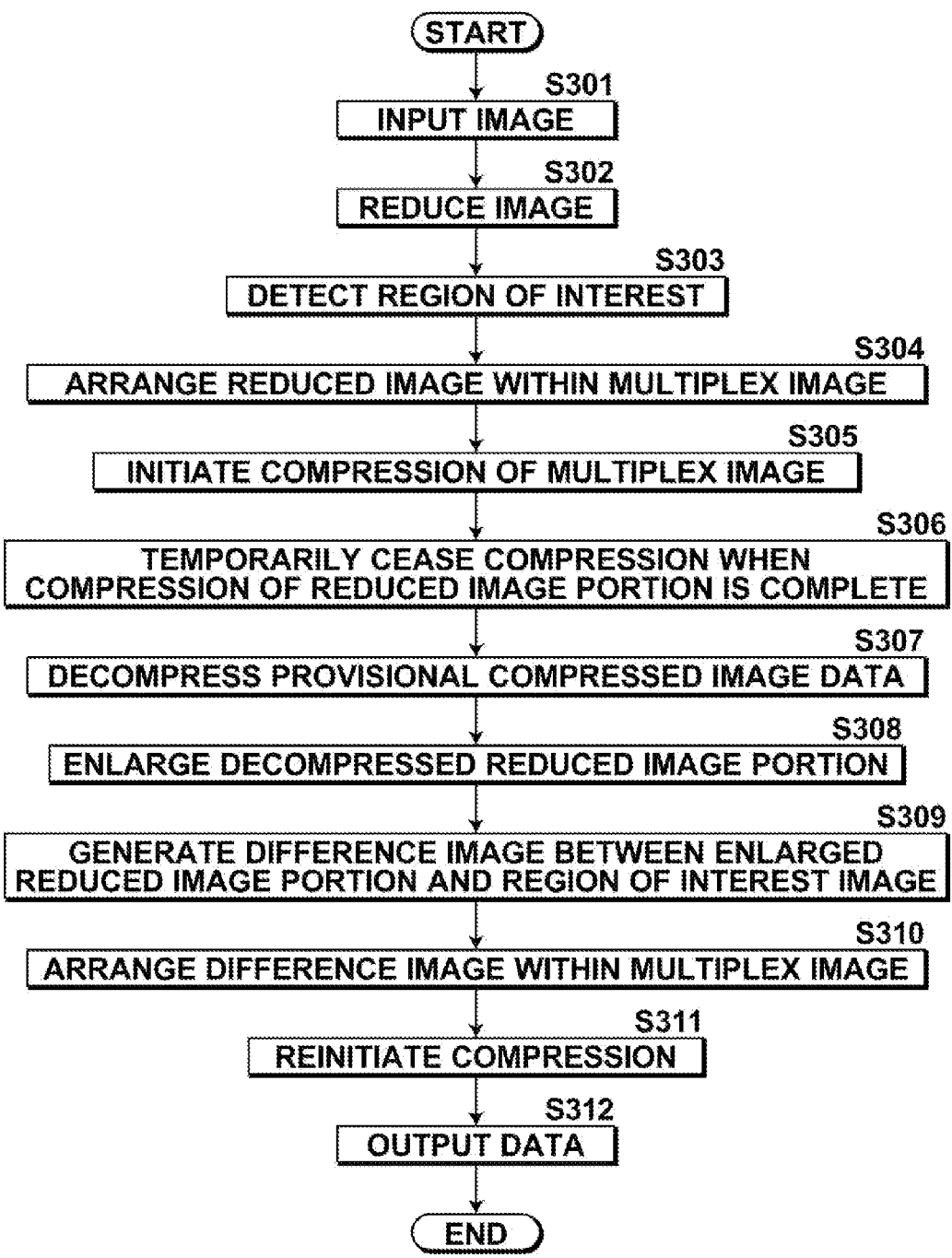
FIG. 8 is a flow chart that illustrates the operational procedures performed by the image compressing apparatus of the second embodiment.

FIG. 8 illustrates the operational procedures performed by the image compressing apparatus of the second embodiment. The image input means 31 inputs a processing target image (step S301). The image reducing means 33 generates a reduced image, by decreasing the resolution of the processing target image (step S302). The image reducing means 33 decreases the image size of the processing target image to ½ the original size in both the vertical and horizontal direction, to generate a reduced image of which the resolution has been decreased to half the original resolution, for example. The image reducing means 33 outputs the generated reduced image to the multiplexing means 34.

The region of interest detecting means 32 detects a region of interest from the processing target image (step S303). The region of interest detecting means 32 extracts the region of interest from the processing target image, and generates an image in which the pixel values of portions other than the extracted region of interest are fixed at a predetermined value, for example, 0 (black), as a region of interest image. The region of interest detecting means 32 outputs the generated region of interest image and region of interest data that indicates the position of the detected region of interest within the processing target image to the difference image generating means 38.

The multiplexing means 34 multiplexes the reduced image and the region of interest image (the difference image) within an image space (step S304). At this stage, the difference image is not yet multiplexed into the multiplex image, and the multiplex image merely secures a space at which the difference image is to be arranged. The compressing means 35 initiates compression of the multiplex image starting at the upper portion thereof.

The compressing means 35 temporarily ceases compression when compression of the reduced image portion of the multiplex image is completed (step S306). The partial image decompressing means 36 receives provisional compressed image data from the compressing means 35 at the point in time at which compression of the reduced image portion of the multiplex image is complete, and decompresses the reduced image portion, based on the received provisional compressed image data (step S307). The enlarging means 37 enlarges the reduced image portion which has been decompressed by the partial image decompressing means 36 to the image size of the processing target image (step S308), and outputs the enlarged reduced image portion to the difference image generating means 38. The difference image generating means 38 generates a difference image between the enlarged reduced image portion and the region of interest image regarding the position of the processing target image that corresponds to the region of interest (step S309).

The difference image generating means 38 outputs the generated difference image to the multiplexing means 34. The multiplexing means 34 adds the difference image to the multiplex image (step S310). At step S310, the multiplexing means 34 arranges the difference image at the space at the lower portion of the multiplex image, which was secured at step S304. The compressing means 35 reinitiates compression of the multiplex image, which was temporarily ceased (step S311). The output means outputs the compressed image data, which is the compressed multiplex image, to an image decompressing apparatus, a storage device, or the like (step S312).

Figure 9:
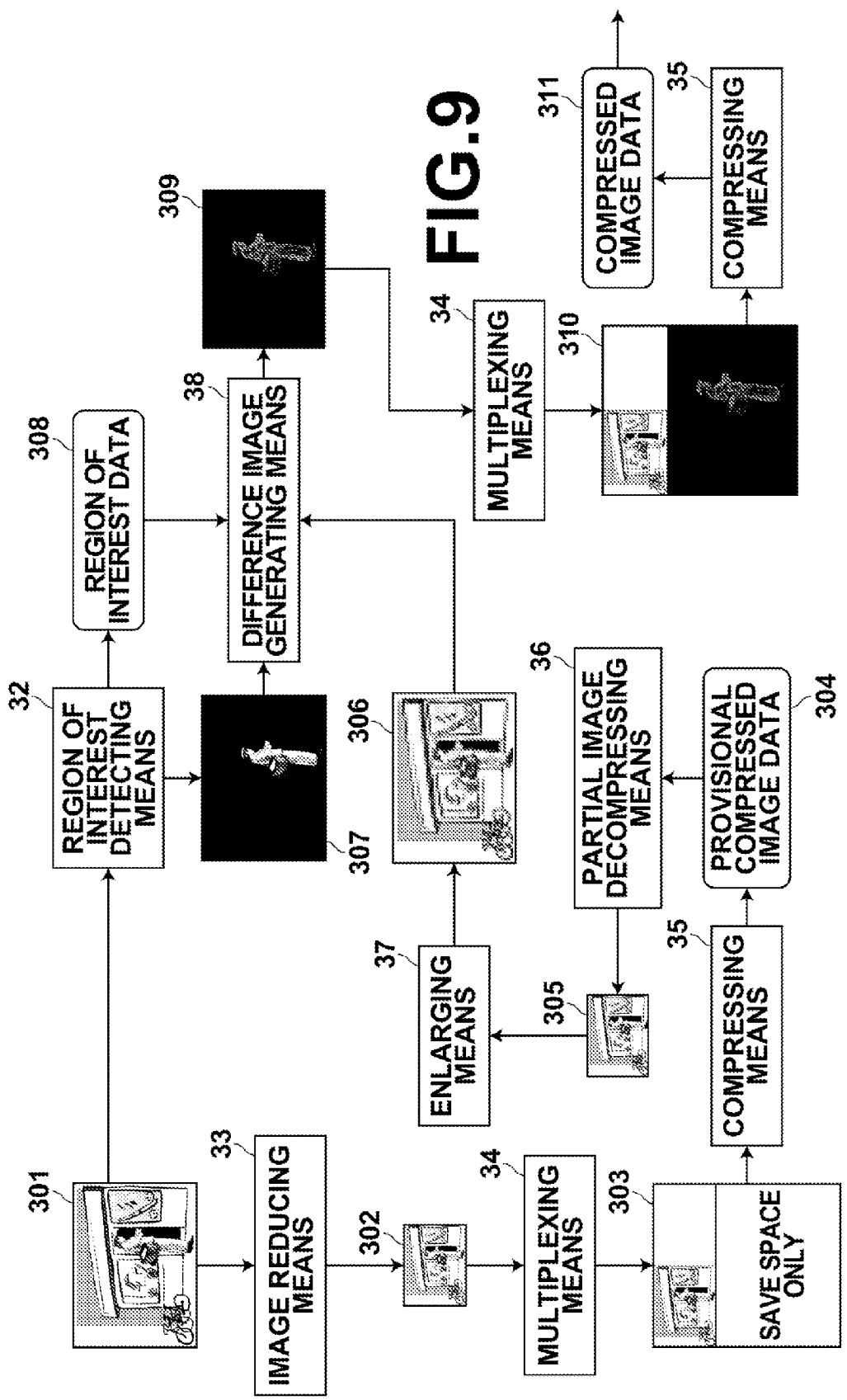
FIG. 9 is a block diagram that illustrates specific examples of images which are generated by each section of the image compressing apparatus of the second embodiment.

FIG. 9 illustrates specific examples of images which are generated by each section of the image compressing apparatus 30 of the second embodiment. An input processing target image 301 is provided to the region of interest detecting means 32 and the image reducing means 33. The image reducing means 33 decreases the resolution of the processing target image 301 to generate a reduced image 302. The processing target image 301 and the reduced image 302 are images that represent the same contents. However, the image size of the reduced image 302 is smaller than that of the processing target image 301.

The region of interest detecting means 32 detects a region that constitutes a person as a region of interest within the processing target image 301, and generates a region of interest image 307. The region of interest detecting means 32 generates an image having the same pixel values as the processing target image 301 at the portion that constitutes the detected person and pixel values fixed at 0 at portions other than the detected person as the region of interest image 307. The region of interest detecting means 32 also generates region of interest data 308 that indicates the position of the region of interest within the processing target image.

The multiplexing means 34 generates a multiplex image 303 in which the reduced image 302 is arranged at the upper portion thereof. The lower portion of the multiplex image 303 is in a state in which space is secured, and no image is arranged within this space at this stage. The compressing means 35 initiates compression of the multiplex image 303 starting at the upper portion thereof, and generates provisional compressed image data 304, in which a reduced image portion of the multiplex image 303 is compressed. The partial image decompressing means 36 decompresses the provisional compressed image data to generate a restored reduced image 305. The contents of the restored reduced image 305 are the same as those of the reduced image 302 reduced by the image reducing means 33. However, the images are not completely the same, and there are portions at which image quality is lower due to compression having been performed.

The enlarging means 37 generates an enlarged image 306, by enlarging the restored reduced image 305 to the image size of the processing target image 301. The difference image generating means 38 employs the region of interest data 308 to cut out the portion that constitutes the person within the region of interest image 307, cuts out a portion having the same pixel positions as the cut out portion that constitutes the person from the enlarged image 306, and generates a difference image 309 between the two images. The multiplexing means 34 generates a multiplex image 310, in which the difference image 309 has been added to the lower portion of the multiplex image 303. The compressing means 35 reinitiates compression of the multiplex image 310 from the portion of the added difference image portion thereof, to generate compressed image data 311. The compressed image data 311 is output via the output means 17.

Figure 10:
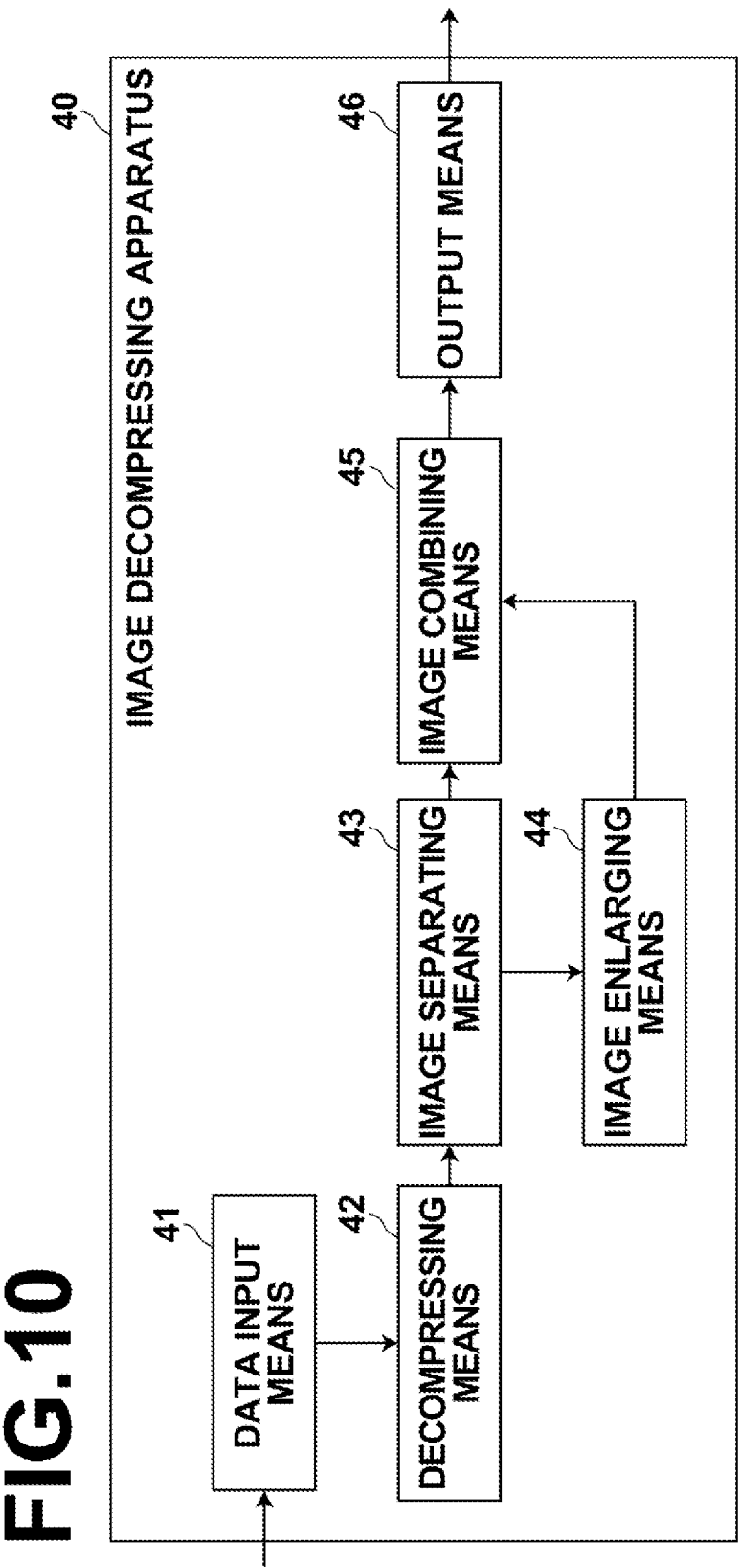
FIG. 10 is a block diagram that illustrates an image decompressing apparatus that corresponds to the image compressing apparatus of the second embodiment.

Next, an image decompressing apparatus that decompresses images which are compressed by the image compressing apparatus 30 will be described. FIG. 10 illustrates an image decompressing apparatus 40 that corresponds to the image compressing apparatus 30. The image decompressing apparatus 40 is equipped with: a data input means 41; a decompressing means 42; an image separating means 43; an image enlarging means 44; an image combining means 45; and an output means 27. The functions of each component of the image decompressing apparatus 40 can be realized by a computer executing processes according to a predetermined program.

The data input means 41 inputs the compressed image data output by the output means 37 of the image compressing apparatus 30 of FIG. 7. That is, the data input means 41 inputs compressed image data obtained by compressing multiplex images, which are obtained by multiplexing reduced images of processing target images and difference images that represent differences between decompressed reduced image portions enlarged to the image size of processing target images and region of interest images extracted from the processing target images, within image spaces. The decompressing means 42 decompresses the compressed image data to generate the multiplex image. The decompressing means 42 decompresses the compressed image data using a decompression method corresponding to the compression method employed by the compressing means 35 of the image compressing apparatus 30.

The image separating means 43 separates the reduced image and the difference image from the multiplex image generated by the decompressing means 42. The image separating means 43 outputs the separated reduced image to the image enlarging means 44, and outputs the difference image to the image combining means 45. The image enlarging means 44 enlarges the separated reduced image to the size of the processing target image. The image size of the difference image is the same as that of the processing target image, and therefore the image size of the enlarged reduced image becomes the same as that of the difference image. The enlarging process performed by the image enlarging means 44 is the inverse of the process performed by the image reducing means 33 of the image compressing apparatus 30.

The image combining means 45 generates a combined image in which the difference image and the reduced image, which has been enlarged by the image enlarging means 44, are combined. At this time, the image combining means 45 employs region of interest data and adds the enlarged reduced image and the difference image to generate the combined image. The region of interest is restored, by adding the enlarged reduced image to the difference image. The output means 46 outputs the combined image generated by the image combining means 45 to a display device for performing image display or the like.

Figure 11:
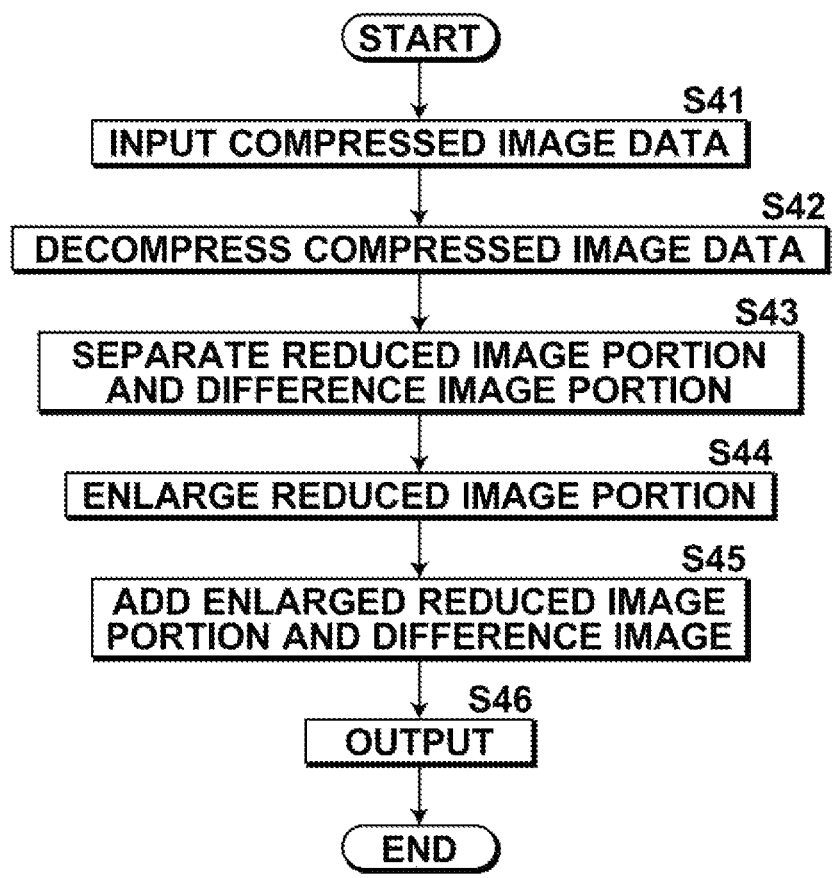
FIG. 11 is a flow chart that illustrates the operational procedures performed by the image decompressing apparatus of FIG. 10.

FIG. 11 illustrates the operational procedures involved in image decompression. The data input means 41 inputs compressed image data, to which region of interest data is attached (step S41). The data input means 41 inputs the compressed input data output by the image compressing apparatus 30 (refer to FIG. 7) to the image decompressing apparatus 40 via a communications network. Alternatively, the data input means 41 may read out the compressed image data from a storage device.

The decompressing means 43 decompresses the compressed image data, to restore the multiplex image which was compressed by the image compressing apparatus 30 (step S42). The image separating means 43 separates the restored multiplex image into the reduced image and the difference image (step S43). The image enlarging means 44 enlarges the reduced image to the image size of the processing target image (step S44). The SR technique may be employed to enlarge the image.

The image combining means 45 combines the reduced image, which has been enlarged, and the difference image (step S45). At step S45, the image combining means 45 combines the images by adding the difference image to the enlarged reduced image. The output means 46 outputs the combined image which is combined by the image combining means 45 to a display apparatus or the like (step S46).

Figure 12:
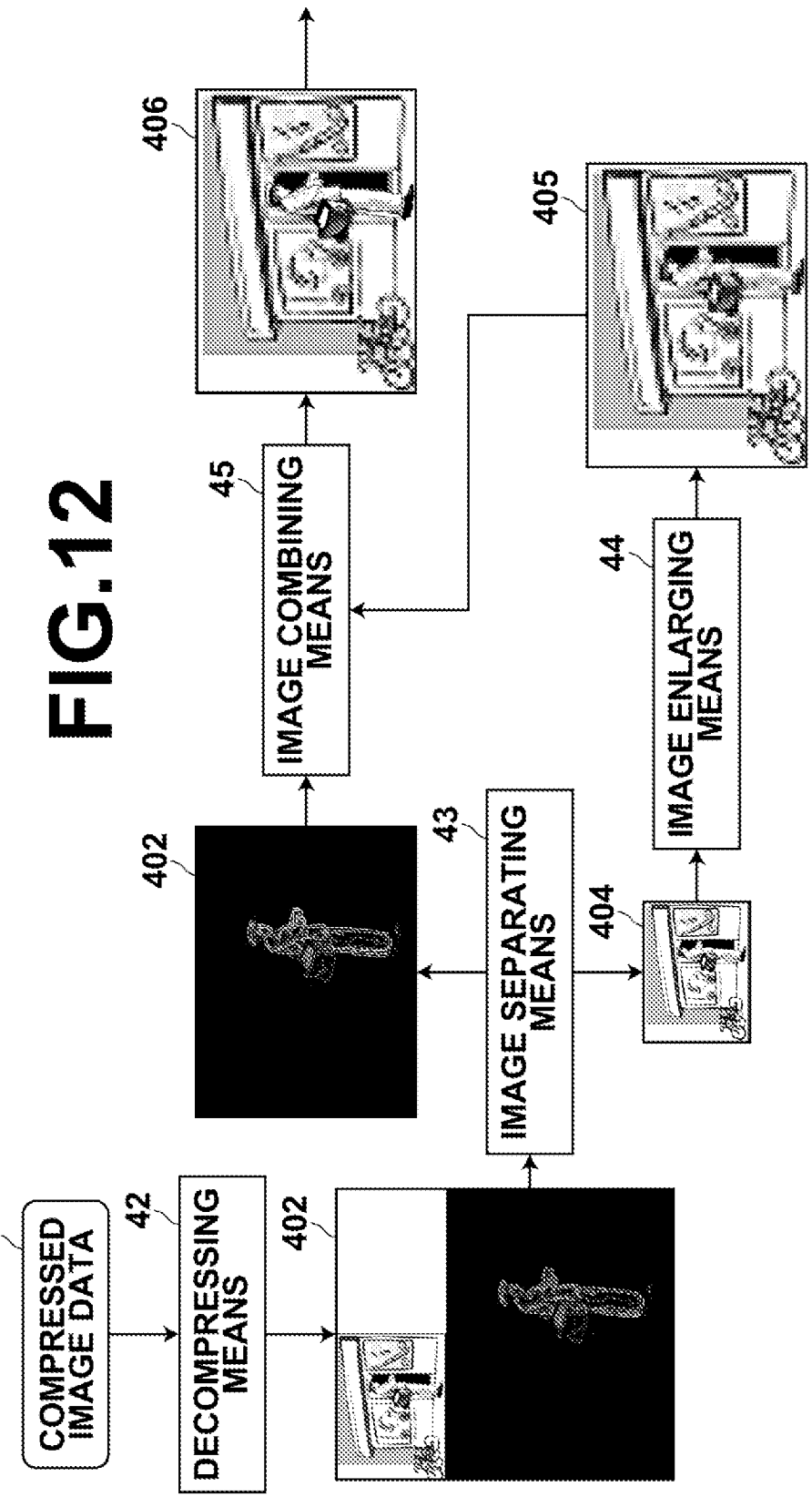
FIG. 12 is a block diagram that illustrates specific examples of images which are generated by each section of the image decompressing apparatus of FIG. 10.

FIG. 12 illustrates specific examples of images which are generated by each section of the image decompressing apparatus 40. Compressed image data 401 is a set of compressed image data obtained by compressing the processing target image 301 illustrated in FIG. 9 with the image compressing apparatus 30, for example. The decompressing means 42 restores a multiplex image 402 from the compressed image data 401. The contents of the multiplex image 402 are the same as those of the multiplex image 310 of FIG. 9. However, the images are not completely the same, and there are portions at which image quality is lower due to compression having been performed.

The image separating means 43 separates a reduced image 404 and a difference image 403 from the multiplex image 402. The image enlarging means 44 enlarges the reduced image 404, and generates a reduced image 405 which has been enlarged. By enlarging the reduced image 404, the image size of the reduced image 405 which has been enlarged becomes the same as the image size of the difference image 403.

The image combining means 45 adds the difference image 403 to the enlarged reduced image 405, to generate a combined image 406. Because the image compressing apparatus 30 generates the difference image 309 by calculating the difference between the enlarged image 306 and the region of interest image 307, the portion that constitutes the person pictured in the region of interest image 307 can be restored by adding the enlarged reduced image 405 and the difference image 403. The combined image 406 is the same as the combined image 207 generated by the image decompressing apparatus 20 corresponding to the image compressing apparatus 10 illustrated in FIG. 6. The image decompressing apparatus 40 outputs the combined image 406.

In the second embodiment, the difference image is multiplexed into the multiplex image instead of the region of interest image. More specifically, compression is performed in a state in which the reduced image is arranged within the multiplex image, the reduced image is restored by decompressing the obtained provisional compressed image data, the restored reduced image is enlarged to its original image size, and a difference is calculated between the enlarged image and the region of interest image with respect to the region of interest. Calculating the difference results in a difference image in which high frequency components of the region of interest image are extracted. The difference image is arranged at the lower portion of the multiplex image, and the reduced image and the difference image are multiplexed into a single multiplex image. The region of interest image prior to the difference being calculated can be obtained, by decompressing the reduced image portion of the multiplex image, enlarging the decompressed image, then adding it to the difference image. In the second embodiment, the original region of interest image can be reproduced without employing the region of interest data by the image decompressing apparatus. Therefore, it is not necessary for the image compressing apparatus to attach region of interest data to the compressed image data. In addition, particularly in the case that the SR technique is employed to enlarge the reduced image, amount of data in the difference image can be decreased, and an advantageous effect, that high compression rates become possible while maintaining image quality, can be obtained. The other advantageous effects are the same as those obtained by the first embodiment.

Figure 13:
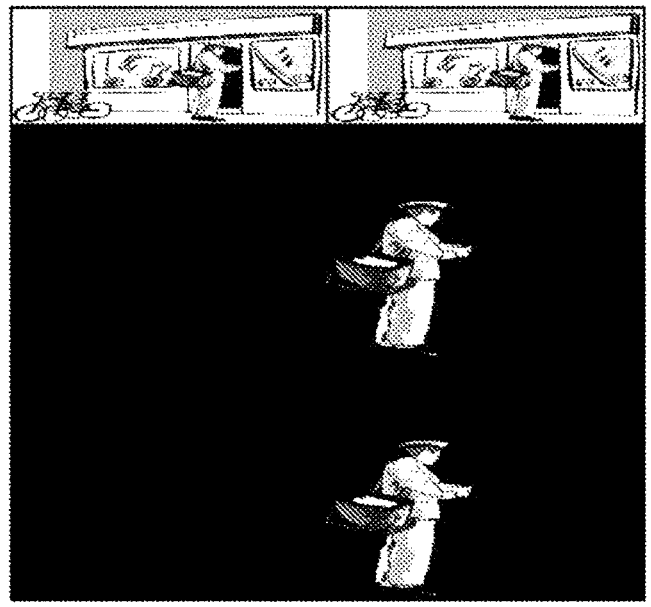
FIG. 13 is a diagram that illustrates an alternate example of a reduced image and a region of interest image which are multiplexed together.

Note that the manner in which the reduced image and the region of interest image (difference image) are arranged within the multiplex image is not limited to that described in the above embodiment, and various multiplexing formats may be considered. FIG. 13 is a diagram that illustrates an alternate example of a reduced image and a region of interest image which are multiplexed together. The size of the reduced image is set to half the size of the region of interest image. In the case that images are input to the image input means 11 (refer to FIG. 1) in an interlaced manner, reduced images for an even numbered field and an odd numbered field may be arranged in the horizontal direction at the upper portion of an image, and region of interest images for an even numbered field and an odd numbered field may be arranged in the vertical direction at the lower portion of the image, as illustrated in FIG. 13. Alternatively, in the case that images are input in a progressive manner, images may be separated into odd numbered rows and even numbered rows, then multiplexing may be performed in the manner illustrated in FIG. 13. In this case, the size of the multiplex image in the horizontal direction is equal to the size of the region of interest image in the horizontal direction, and the size of the multiplex image in the vertical direction is equal to a sum of the size of the reduced image in the vertical direction and twice the size of the region of image in the vertical direction. In the case that input images are not interlaced, a blank portion, at which an image is not arranged, will be generated at the upper portion of a multiplex image, as in the multiplex image 104 of FIG. 3. By dividing the reduced images into even numbered fields and odd numbered fields and arranging them in the horizontal direction within the multiplex image, the wasted blank portion can be reduced.

In the above embodiments, the image compressing apparatuses and image decompressing apparatuses were described as separate apparatuses. However, the image compressing apparatuses and the image decompressing apparatuses can be combined to constitute an image compressing/decompressing apparatus (system). In the image compressing/decompressing system, the image compressing apparatus and the image decompressing apparatus may be provided at different locations. For example, the image compressing apparatus may be provided at a facility to be monitored along with an imaging device, the image decompressing apparatus may be provided at a monitoring center, and the two locations may be connected via communications circuits or the like. In this case, a remote monitoring system in which the compression rate for portions corresponding to backgrounds can be increased to reduce data transmission amounts while enabling high quality display of portions that constitute people can be provided.

In the first embodiment, the number of regions of interest detected by the region of interest detecting means 12 is not limited to one, and a plurality of regions of interest may be detected by the region of interest detecting means 12. In this case, the multiplexing means 14 may multiplex a plurality of region of interest images and a reduced image into a single multiplex image. In the second embodiment as well, the region of interest detecting means 32 may detect a plurality of regions of interest. In this case, the difference image generating means 38 may calculate differences between each of a plurality of regions of interest images and a reduced image, and generate a plurality of difference images each corresponding to the plurality of region of interest images. The multiplexing means 34 may multiplex the plurality of region of interest images and the reduced image into a single multiplex image.

Preferred embodiments of the present invention have been described above. However, the image compressing apparatus, the image decompressing apparatus, the image compressing method, the image decompressing method, the image compressing program, and the image decompressing program of the present invention are not limited to those described in the embodiments. Various modifications to and changes from the above embodiments are possible, as long as they do not stray from the spirit and the scope of the present invention as claimed.

What is claimed is:

1. An image compressing apparatus, comprising:
    a reduced image generator that generates a reduced image by reducing the image size of an input processing target image;
    a region of interest detector that detects a region of interest from the processing target image and generates a region of interest image by extracting the region of interest detected within the processing target image from the processing target image;
    an image multiplexer that generates a multiplex image by multiplexing the reduced image and the region of interest image within an image space; and
    a compressor that generates compressed image data by compressing the multiplex image generated by the image multiplexer.

2. An image compressing apparatus as defined in claim 1, wherein:
    the image multiplexer multiplexes the reduced image and the region of interest image at different regions of the multiplex image.

3. An image compressing apparatus as defined in claim 1, wherein:
    the image multiplexer performs multiplexing by arranging the reduced image at the upper portion of the multiplex image and arranging the region of interest image at the lower portion of the multiplex image.

4. An image compressing apparatus as defined in claim 3, further comprising:
    a partial image decompressor that decompresses the portion of the multiplex image at which the reduced image is arranged, which has been compressed by the compressor, based on the compressed image data;
    an enlarger that enlarges the portion of the multiplex image at which the reduced image is arranged, which has been decompressed by the partial image decompressor to the image size of the processing target image; and
    a difference image generator that generates a difference image between the portion of the multiplex image at which the reduced image is arranged, which has been enlarged by the enlarger, and the region of interest image; wherein:
    the compressor initiates compression from the upper portion of the multiplex image, temporarily ceases compression when compression of the portion of the multiplex image at which the reduced image is arranged is complete;
    the partial image decompressor receives provisional compressed image data from the compressor at the point in time at which the compressor completes compression of the portion of the multiplex image at which the reduced image is arranged, and decompresses the portion of the multiplex image at which the reduced image is arranged based on the received provisional compressed image data;
    the image multiplexer arranges the difference image at the lower portion of the multiplex image instead of the region of interest image and multiplexes the reduced image and the difference image within an image space; and
    the compressor reinitiates compression of the multiplex image after the difference image is arranged at the lower portion of the multiplex image.

5. An image compressing apparatus as defined in claim 1, further comprising:
    a region of interest data attacher that attaches region of interest data related to the position of the detected region of interest within the processing target image to the compressed image data.

6. An image decompressing apparatus, comprising:
    a decompressor that decompresses compressed image data, which is a multiplex image obtained by multiplexing a reduced image obtained by reducing a processing target image and a region of interest image obtained by extracting a region of interest portion from the processing target image in an image space and then compressed, to generate the multiplex image;
    an image separator that separates the reduced image and the region of interest image within the multiplex image generated by the decompressor;
    an image enlarger that enlarges the separated reduced image to the size of the processing target image; and a combined image generator that generates a combined image by combining the reduced image, which has been enlarged by the image enlarger, and the region of interest image.

7. An image decompressing apparatus as defined in claim 6, wherein:
region of interest data related to the position of the region of interest within the processing target image is attached to the compressed image data;
the image decompressing apparatus further comprises a region of interest data separator that separates the region of interest data from the compressed image data; and
the combined image generator generates the combined image by employing the region of interest data to overlap the region of interest image on the reduced image, which has been enlarged.

8. An image decompressing apparatus as defined in claim 6, wherein:
the multiplex image is obtained by multiplexing the reduced image and a difference image instead of multiplexing the reduced image and the region of interest image, the difference image being obtained by compressing the reduced image, decompressing the compressed reduced image, enlarging the decompressed reduced image to the size of the processing target image, and calculating the difference between the enlarged reduced image and the region of interest image;
the image separator separates the reduced image and the difference image within the multiplex image instead of the reduced image and the region of interest image; and
the combined image generator combines the reduced image, which has been enlarged, and the difference image instead of the reduced image, which has been enlarged, and the region of interest image.

9. An image decompressing apparatus as defined in claim 8, wherein:
the combined image generator generates the combined image by adding the difference image to the reduced image, which has been enlarged.

10. An image compressing/decompressing apparatus, comprising:
a reduced image generator that generates a reduced image by reducing the image size of an input processing target image;
a region of interest detector that detects a region of interest from the processing target image and generates a region of interest image by extracting the region of interest detected within the processing target image from the processing target image;
an image multiplexer that generates a multiplex image by multiplexing the reduced image and the region of interest image within an image space;
a compressor that generates compressed image data by compressing the multiplex image generated by the image multiplexer;
a decompressor that decompresses the compressed image data, to generate the multiplex image;
an image separator that separates the reduced image and the region of interest image within the multiplex image generated by the decompressor;
an image enlarger that enlarges the separated reduced image to the size of the processing target image; and
a combined image generator that generates a combined image by combining the reduced image, which has been enlarged by the image enlarger, and the region of interest image.

11. An image compressing method, comprising the steps of:
generating a reduced image by reducing the image size of an input processing target image;
detecting a region of interest from the processing target image and generating a region of interest image by extracting the region of interest detected within the processing target image from the processing target image;
generating a multiplex image by multiplexing the reduced image and the region of interest image within an image space; and
generating compressed image data by compressing the generated multiplex image.

12. An image compressing method, comprising the steps of:
generating a reduced image by reducing the image size of an input processing target image;
detecting a region of interest from the processing target image and generating a region of interest image by extracting the region of interest detected within the processing target image from the processing target image;
arranging the reduced image at the upper portion of a multiplex image and arranging the region of interest image at the lower portion of the multiplex image within an image space for multiplexing the reduced image and the region of interest image;
sequentially compressing the multiplex image from the upper portion thereof;
temporarily ceasing compression when compression of the portion of the multiplex image at which the reduced image is arranged is complete;
decompressing the portion of the multiplex image at which the reduced image is arranged based on provisional compressed image data at the point in time at which compression of the portion of the multiplex image at which the reduced image is arranged is complete;
enlarging the decompressed portion of the multiplex image at which the reduced image is arranged to the image size of the processing target image;
generating a difference image between the portion of the multiplex image at which the reduced image is arranged, which has been enlarged, and the region of interest image; and
arranging the difference image at the lower portion of the multiplex image, then reinitiating compression of the multiplex image, to generate compressed image data of the multiplex image.

13. An image decompressing method, comprising the steps of:
decompressing compressed image data which is generated by compressing a multiplex image, to generate the multiplex image, the multiplex image being obtained by multiplexing a reduced image obtained by reducing a processing target image and a region of interest image obtained by extracting a region of interest portion from the processing target image in an image space;
separating the reduced image and the region of interest image within the generated multiplex image;
enlarging the separated reduced image to the size of the processing target image; and
generating a combined image by combining the reduced image, which has been enlarged, and the region of interest image.

14. An image decompressing method, comprising the steps of:
decompressing compressed image data which is generated by compressing a multiplex image, to generate the multiplex image, the multiplex image being obtained by multiplexing, in an image space, a reduced image obtained by reducing a processing target image and a difference image obtained by compressing the reduce image, decompressing the compressed reduced image, enlarging the decompressed reduced image to the size of the processing target image, and calculating the difference between the enlarged reduced image and a region of interest image obtained by extracting a region of interest portion from the processing target image;

separating the reduced image and the difference image within the generated multiplex image;

enlarging the separated reduced image to the size of the processing target image; and generating a combined image by combining the reduced image, which has been enlarged, and the difference image.

15. A non transitory computer readable recording medium having an image compressing program recorded thereon, the image compressing program causing a computer to execute the procedures of:

generating a reduced image by reducing the image size of an input processing target image;

detecting a region of interest from the processing target image and generating a region of interest image by extracting the region of interest detected within the processing target image from the processing target image;

generating a multiplex image by multiplexing the reduced image and the region of interest image within an image space; and generating compressed image data by compressing the generated multiplex image.

16. A non transitory computer readable recording medium having an image compressing program recorded thereon, the image compressing program causing a computer to execute the procedures of:

generating a reduced image by reducing the image size of an input processing target image;

detecting a region of interest from the processing target image and generating a region of interest image by extracting the region of interest detected within the processing target image from the processing target image;

arranging the reduced image at the upper portion of a multiplex image and arranging the region of interest image at the lower portion of the multiplex image within an image space for multiplexing the reduced image and the region of interest image;

sequentially compressing the multiplex image from the upper portion thereof;

temporarily ceasing compression when compression of the portion of the multiplex image at which the reduced image is arranged is complete;

decompressing the portion of the multiplex image at which the reduced image is arranged based on provisional compressed image data at the point in time at which compression of the portion of the multiplex image at which the reduced image is arranged is complete;

enlarging the decompressed portion of the multiplex image at which the reduced image is arranged to the image size of the processing target image;

generating a difference image between the portion of the multiplex image at which the reduced image is arranged, which has been enlarged, and the region of interest image; and arranging the difference image at the lower portion of the multiplex image, then reinitiating compression of the multiplex image, to generate compressed image data of the multiplex image.

17. A non transitory computer readable recording medium having an image decompressing program recorded thereon, the image decompressing program causing a computer to execute the procedures of:

decompressing compressed image data which is generated by compressing a multiplex image, to generate the multiplex image, the multiplex image being obtained by multiplexing a reduced image obtained by reducing a processing target image and a region of interest image obtained by extracting a region of interest portion from the processing target image in an image space;

separating the reduced image and the region of interest image within the generated multiplex image;

enlarging the separated reduced image to the size of the processing target image; and generating a combined image by combining the reduced image, which has been enlarged, and the region of interest image.

18. A non transitory computer readable recording medium having an image decompressing program recorded thereon, the image decompressing program causing a computer to execute the procedures of:

decompressing compressed image data which is generated by compressing a multiplex image, to generate the multiplex image, the multiplex image being obtained by multiplexing, in an image space, a reduced image obtained by reducing a processing target image and a difference image obtained by compressing the reduced image, decompressing the reduced image, enlarging the decompressed reduced image to the size of the processing target image, and calculating the difference between the decompressed reduced image and a region of interest image obtained by extracting a region of interest portion from the processing target image;

separating the reduced image and the difference image within the generated multiplex image;

enlarging the separated reduced image to the size of the processing target image; and generating a combined image by combining the reduced image, which has been enlarged, and the difference image.

* * * * *